United States Patent [19]

Rinio

[11] 4,042,212
[45] Aug. 16, 1977

[54] CABLE HAULING APPARATUS

[76] Inventor: Johannes Augustus Rinio, 5, Promenade Venesia, Grand Siede, 7800 Versailles, France

[21] Appl. No.: 674,441

[22] Filed: Apr. 7, 1976

Related U.S. Application Data

[63] Continuation of Ser. No. 490,977, July 23, 1974, abandoned.

[51] Int. Cl.$^2$ .............................................. A63B 61/04
[52] U.S. Cl. ...................................... 254/164; 254/73; 81/177 D; 74/544
[58] Field of Search .................... 254/164, 169, 73, 74, 254/161; 74/543, 551, 544, 523; 81/177 D

[56] References Cited

U.S. PATENT DOCUMENTS

| 512,384 | 1/1894 | Meacham | 81/177 D |
|---|---|---|---|
| 858,240 | 6/1907 | Werner | 254/74 |
| 1,993,755 | 3/1935 | Spoor | 254/73 |
| 2,087,655 | 7/1937 | Prestwich | 254/73 |
| 2,463,138 | 3/1949 | Bamberg | 81/177 D |
| 3,727,886 | 4/1973 | Cain | 254/164 |

Primary Examiner—Albert J. Makay
Assistant Examiner—Kenneth Noland
Attorney, Agent, or Firm—John J. Dennemeyer

[57] ABSTRACT

A cable hauling apparatus comprising clamp jaws that are oppositely movable by means of a pivotable hand lever is provided with two hand grips associated with the hand lever. One of the two hand grips is located on one side of the apparatus and the other hand grip is located on the opposite side of the apparatus.

3 Claims, 5 Drawing Figures

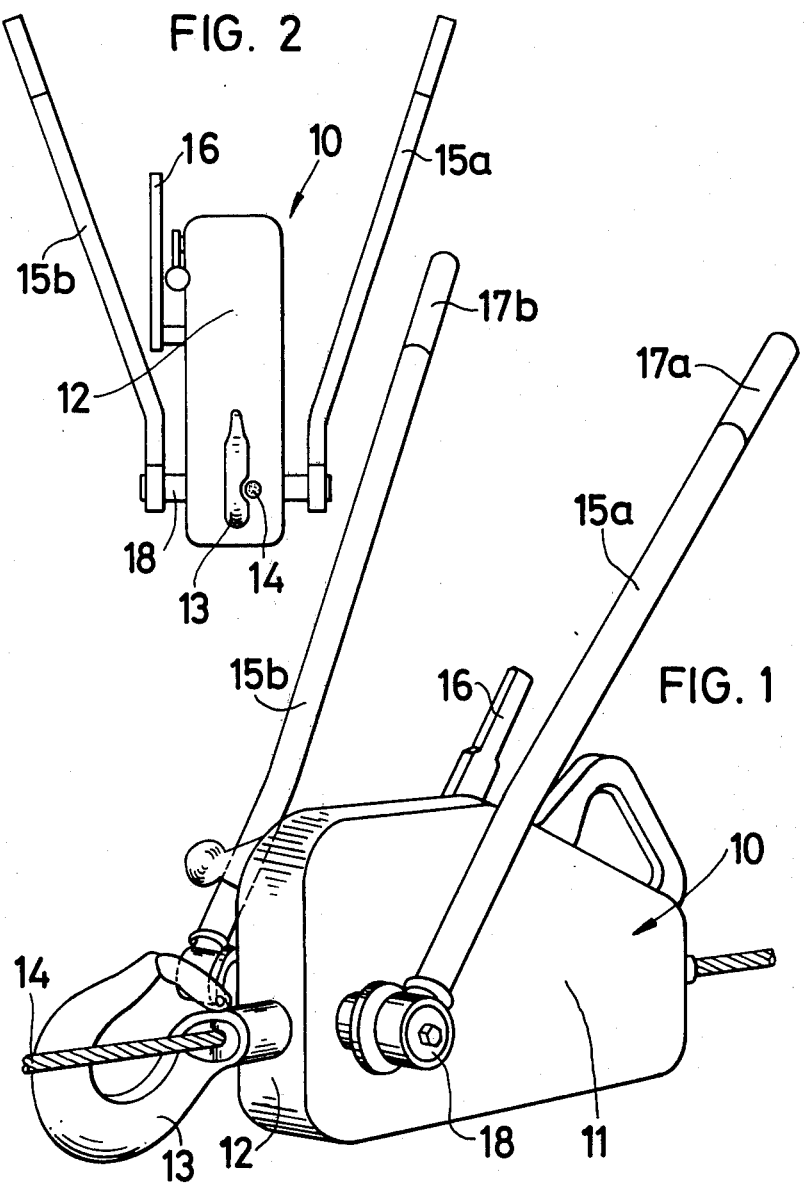

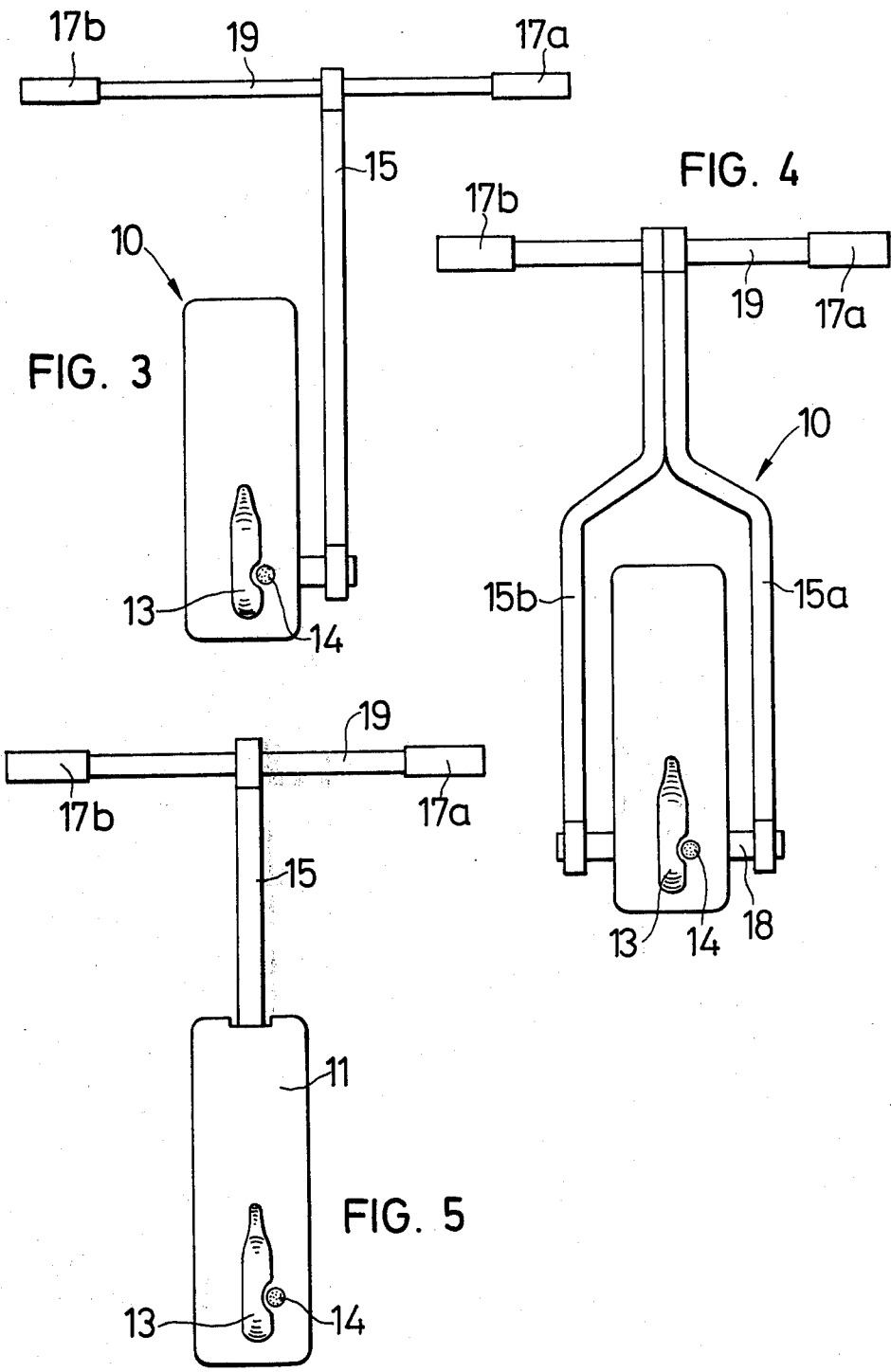

CABLE HAULING APPARATUS

This is a continuation of application Ser. No. 490,977, filed July 23, 1974 now abondoned.

The invention relates to a cable hauling apparatus comprising clamp jaws which are secured in two blocks and are movable in opposite directions by a pivotable hand lever arranged on one side of the apparatus so as to alternately grip and advance the cable which is pulled through the apparatus.

The known apparatus of this type are limited in their traction force because the force which may be exerted by an operator on the hand lever cannot exceed a predetermined maximum value of about 50 kg and because the lever cannot have a random length and reduction if the apparatus is to remain handy, and to prevent that the stroke becomes too small.

It is an object of the invention to avoid this disadvantage and to design the apparatus in such a way that it may be used to manually lift or pull greater loads.

In accordance with the invention a cable hauling apparatus is provided wherein at least two hand grips are associated with the first hand lever for the lifting operation, one of said hand grips being located on one side of the apparatus and the other hand grip on the opposite side of the apparatus.

In view of this arrangement it is possible to actuate the apparatus by more than one operator so that a double force may be exerted on the lever shaft without having to change the reduction ratio or to increase the length of the hand lever. In order to avoid that the operators working on both sides of the cable hauling apparatus do not hinder each other it is appropriate to arrange the hand grips on a transverse rod which is fixed at the upper end of the lever. In this construction the lever carrying the transverse rod may be arranged in the central plane of the apparatus.

According to another embodiment of the invention the lever may comprise two parts which are mounted on a common drive shaft at two opposite sides of the apparatus. A hand grip may be arranged on each of the two parts of the lever. The two parts of the lever are then preferably angled outwardly or cranked at their upper ends in a direction toward each other. They may also carry at the upper end a transverse rod with hand grips.

This construction has the advantage that both operators on the opposite sides of the rather small apparatus have sufficient room in order to apply their full strength in moving the hand lever.

The invention will now be explained in greater detail by referring to embodiments shown on the accompanying drawings, wherein:

FIG. 1 is a cable hauling apparatus according to the invention in perspective view, FIG. 2 shows the apparatus of FIG. 1 in a front view, FIG. 3 is a second embodiment of the invention in a front view, FIG. 4 is a third embodiment of the invention also in a front view, and FIG. 5 is a fourth embodiment of the invention in a front view.

In the drawings numeral 10 indicates a cable hauling aparatus of known construction, which comprises a housing 11 having fixed thereto at its front side 12 a load hook 13. A traction cable 14 runs through the housing 11 and carries at its one end a second load hook, not shown, on which a load is suspended. The cable 14 is pulled by clamp jaws through the apparatus in a manner not shown herein. The clamp jaws are fixed in blocks which are moved in opposite directions by pivotable hand levers 15 or 16 such that the cable is always clamped between two clamp jaws and advanced thereby while the other two clamp jaws slide along the cable. A first hand lever 15 associated with the clamp jaws serves to raise the load and a second hand lever 16 associated with the clamp jaws serves to lower the load. Each of the two levers 15 and 16 is mounted on its proper shaft, which is lodged in the apparatus housing 11.

In the embodiment shown in FIGS. 1 and 2 the first hand lever 15 for raising the load consists of two parts 15a and 15b which are fixed on two opposite sides of the apparatus 10 on a common drive shaft 18. Each lever part 15a and 15b carries at its free end a hand grip 17a and 17b on which the two lever parts 15a and 15b may be commonly and simultaneously actuated. During actuation of these levers the second hand lever 16 moves along freely as is common in this type of apparatus.

For an easy actuation of the hand levers 15a and 15b they are angled outwardly in the embodiment of FIGS. 1 and 2.

In the embodiment of FIG. 3 the hand lever 15 carries at its free end a transverse rod 19 provided at both ends with hand grips 17a and 17b. In this embodiment the hand lever 15 may be actuated by two operators who stand one on each side of the apparatus 10.

In the cable hauling device shown in FIG. 4 both parts 15a and 15b of the hand lever 15 are arranged as in the embodiment of FIGS. 1 and 2 on a common shaft 18, but they are cranked toward one another at their upper ends so that they are joined directly above the apparatus and carry at their free end a transverse rod 19 which has again at its two extremities a hand grip 17a and 17b.

In the embodiment of FIG. 5 the hand lever 15 is located in the center of the housing 11 and carries, as in the preceding embodiments, at its free end a transverse rod 19 which is again provided at its two extremities with hand grips 17 a and 17 b.

If the load suspended on the cable 14 is to be lowered the hand lever 15 made of tubular material or its two parts 15 a and 15 b may be removed and may be slipped over the stub of the actuating lever 16. It is normally sufficient to slip only one lever over the stub. In a similar manner it is also possible to slip over the stub a lever provided with two hand grips, as shown in FIGS. 3 and 5, so that also for the lowering of the load the apparatus may be actuated by an operator on each side.

What is claimed is:

1. In a cable hauling apparatus having oppositely movable clamp jaws mounted in two blocks that are oppositely longitudinally movable by at least one generally vertically extending lever connected to a laterally extending drive shaft to alternatively clamp a cable normally extending longitudinally through the apparatus and advance same longitudinally with respect to the apparatus, the improvement comprising:

said drive shaft having at least one end extending beyond one side of the apparatus, said hand lever being rigidly secured to said one end of the drive shaft on one side of the apparatus and extending generally vertically beyond the top of the apparatus at its distal end, the hand lever being pivotally movable in a vertical, longitudinal plane to actuate the drive shaft about its axis; a transverse rod secured to the lever intermediate the ends of the rod adjacent the distal end of the lever, the transverse rod extending generally parallel to the drive shaft transversely of the apparatus, one end of the rod extending substantially beyond the side of the apparatus opposite the side beyond which the one end of the drive shaft extends, the opposite end of the rod extending substantially beyond the lever in the opposite direction; and handle grip means at each end of the transverse rod, whereby two individual operators standing on opposite sides of the apparatus can simultaneously apply full manual actuating force to the drive shaft of the apparatus through the grips, rod and lever without interfering with each other.

2. The apparatus recited in claim 1, further wherein the drive shaft has a second end extending beyond the side of the apparatus opposite the first-recited side of the apparatus, and a second generally vertically extending lever is rigidly secured at one end to said second end of said drive shaft for pivotal movement in a vertical, longitudinally extending plane, said second lever extending parallel to the first lever, and being rigidly secured adjacent its distal end to said transverse rod at a point along the rod adjacent the attachment point of the first lever.

3. The apparatus recited in claim 2, further wherein the upper portions of each lever adjacent their distal ends are offset inwardly and contiguous to each other above the upper surface of the apparatus.

* * * * *